(12) United States Patent
Wang et al.

(10) Patent No.: US 12,168,755 B2
(45) Date of Patent: Dec. 17, 2024

(54) METHOD AND SYSTEM FOR TREATING CATALYTIC CRACKING REACTION PRODUCT AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Di Wang, Beijing (CN); Xiaoli Wei, Beijing (CN); Jianhong Gong, Beijing (CN); Jingchuan Yu, Beijing (CN); Jiushun Zhang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 264 days.

(21) Appl. No.: 17/755,489

(22) PCT Filed: Aug. 4, 2020

(86) PCT No.: PCT/CN2020/106745
§ 371 (c)(1),
(2) Date: Apr. 29, 2022

(87) PCT Pub. No.: WO2021/082578
PCT Pub. Date: May 6, 2021

(65) Prior Publication Data
US 2022/0396740 A1 Dec. 15, 2022

(30) Foreign Application Priority Data
Oct. 30, 2019 (CN) .......................... 201911048194.1

(51) Int. Cl.
*C10G 69/04* (2006.01)
*C10G 7/00* (2006.01)
(Continued)

(52) U.S. Cl.
CPC ............... *C10G 69/04* (2013.01); *C10G 7/00* (2013.01); *C10G 45/44* (2013.01); *C10G 61/04* (2013.01);
(Continued)

(58) Field of Classification Search
CPC .. C10G 45/44–56; C10G 61/04; C10G 63/04; C10G 63/08; C10G 67/04; C10G 67/0409; C10G 67/0436; C07C 6/12–126
See application file for complete search history.

(56) References Cited

U.S. PATENT DOCUMENTS 5,310,477 A 5/1994 Lomas
5,948,240 A * 9/1999 Mulvaney, III ........ C10G 35/04
208/146
(Continued)

FOREIGN PATENT DOCUMENTS

CN 1667089 A 9/2005
CN 1752058 A 3/2006
(Continued)

*Primary Examiner* — Renee Robinson
(74) *Attorney, Agent, or Firm* — NKL Law; Allen Xue (57) ABSTRACT

In a method and system for treating a catalytic cracking gasoline, a catalytic cracking process, or a plant employs a fluidized reactor to carry out hydrodealkylation treatment on a catalytic cracking oil gas or catalytic cracking gasoline, so that heavy aromatics present therein can be efficiently converted into light olefins and light aromatics. The method and system can improve the yield of light olefins, allow a long-period stable operation, relieve the contradiction between supply and demand of light aromatics, and solve the problem of high content of heavy aromatics that have low (Continued)

value and are difficult to be utilized in aromatics present in oil gas from catalytic cracking units.

22 Claims, 3 Drawing Sheets

(51) Int. Cl.
*C10G 45/44* (2006.01)
*C10G 61/04* (2006.01)
*C10G 63/08* (2006.01)
*C10G 67/04* (2006.01)
*C10G 69/00* (2006.01)

(52) U.S. Cl.
CPC ......... *C10G 63/08* (2013.01); *C10G 67/0481* (2013.01); *C10G 69/00* (2013.01); *C10G 2300/1059* (2013.01); *C10G 2300/4006* (2013.01); *C10G 2300/4012* (2013.01); *C10G 2300/4018* (2013.01); *C10G 2300/4081* (2013.01); *C10G 2400/20* (2013.01); *C10G 2400/30* (2013.01)

(56) References Cited

U.S. PATENT DOCUMENTS

| | | | |
|---|---|---|---|
| 8,940,950 B2 * | 1/2015 | Ellrich | ........... C10G 55/04 208/53 |
| 2008/0116112 A1 | 5/2008 | Umansky et al. | |

FOREIGN PATENT DOCUMENTS

| | | |
|---|---|---|
| CN | 1906272 A | 1/2007 |
| CN | 101348733 A | 1/2009 |
| CN | 101362669 A | 2/2009 |
| CN | 101734986 A | 6/2010 |
| CN | 103059954 A | 4/2013 |
| CN | 103930524 A | 7/2014 |
| CN | 104673377 A | 6/2015 |
| CN | 105238441 A | 1/2016 |
| CN | 107779224 A | 3/2018 |
| CN | 108359495 A | 8/2018 |
| CN | 108485702 A | 9/2018 |
| RU | 2554867 C2 | 6/2015 |
| RU | 2562238 C2 | 9/2015 |
| WO | 2017196501 A1 | 11/2017 |
| WO | WO-2018071184 A1 * | 4/2018 ........... B01J 29/068 |

* cited by examiner

METHOD AND SYSTEM FOR TREATING CATALYTIC CRACKING REACTION PRODUCT AND USE THEREOF

CROSS REFERENCE TO RELATED APPLICATIONS

This application is a U.S. national stage entry of PCT international application no. PCT/CN2020/106745, filed Aug. 4, 2020, which claims priority from the patent application No. 201911048194.1, titled "method and system for treating catalytic cracking gasoline, process and device for catalytic cracking", filed on Oct. 30, 2019, the contents of which are incorporated herein by reference in their entirety.

TECHNICAL FIELD

The present application relates to the field of catalytic cracking, particularly to a method and system for treating catalytic cracking reaction product and use thereof.

BACKGROUND ART (benzene, toluene and xylene) is an important petrochemical basic product and an important starting material for various chemical products such as synthetic rubber, synthetic fiber and synthetic resin, and the toluene and xylene can also be used as an additive for improving the octane number of gasoline. Due to the continuous developing of terylene, polyester and PTA industries in China, the growth of global aromatic hydrocarbon industrial chain is concentrated in northeast Asia regions, and the demand of BTX is continuously increased. However, aromatics production processes are accompanied by the production of C9+ aromatics, and current production of C9+ aromatics with low value and limited utilization is very large, which causes a waste of resources. Thus, the conversion of C9+ aromatics in the catalytic cracking gasoline into BTX, with a co-production of more light olefins, is undoubtedly an effective way for fully utilizing resources and improving the quality and efficiency of enterprises.

CN101362669A discloses a catalytic conversion method for preparing ethylene, propylene and aromatics, characterized in that comprising the steps of contacting hydrocarbon feedstocks with different cracking behaviors with a catalytic cracking catalyst to conduct a cracking reaction in a fluidized bed reactor, separating the spent catalyst and reaction oil gas, recycling the spent catalyst to the reactor after regeneration, and separating the reaction oil gas to obtain the target products, namely light olefin and aromatics, wherein a fraction of 160-260° C. is recycled to the catalytic cracking for reuse, and ethane, propane and butane are subjected to steam cracking to further produce ethylene and propylene. The method is capable of producing light olefins such as ethylene, propylene and the like from heavy feedstocks to the maximum extent, with a co-production of aromatics such as toluene, xylene and the like, thereby the yields of ethylene and propylene can both be more than 20 wt %.

CN1752058A discloses a method for hydrodealkylation and transalkylation of heavy aromatics, which mainly aims at solving the problems in the prior art, that is a low allowable content of heavy aromatics in feedstocks and a utilization rate of heavy aromatics. The method solves the above problems by conducting a reaction in a fixed bed reactor at a temperature of 300-600° C. and a pressure of 1.0-4.0 MPa using C10 or/and C11 aromatics as feedstock, and a macroporous zeolite loaded with metallic bismuth and molybdenum or oxides thereof as catalyst, to produce mixed xylene. The method has the characteristics of simple process, high yield of mixed xylene, low hydrogen-hydrocarbon ratio and the like, and can be used for industrial production of mixed xylene from heavy aromatics.

CN1906272A discloses a process for the separate catalytic hydrodealkylation of hydrocarbons comprising C8-C13 alkyl-aromatics optionally mixed with C4-C9 aliphatic and cycloaliphatic products, which process comprises continuously treating the hydrocarbon composition with a catalyst consisting of ZSM-5 zeolite and modified with at least one metal selected from Group IIB, Group VIB, and Group VIII metals, in the presence of hydrogen, at a temperature of 400-650° C., a pressure of 2-4 MPa, and a $H_2$/feedstock molar ratio of 3-6. The process can provide a total yield of benzene and toluene up to 75%.

CN101348733A discloses a process for producing light aromatics and light paraffins from hydrocarbon feedstocks, comprising the steps of reacting a hydrocarbon feedstock with a boiling point of 30-250° C. in the presence of a zeolite catalyst comprising Pt or Pd, subjecting heavy aromatics in the hydrocarbon feedstock to hydrodealkylation and to transalkylation reaction with light aromatics, subjecting the light aromatics to isomerization reaction to convert them into a component rich in BTX (B is benzene, T is toluene, and X is xylene) light aromatics, subjecting non-aromatics to hydrocracking reaction to generate light paraffins, separating liquid products into benzene, toluene, xylene, and C9+ aromatics according to the difference in boiling points in a distillation column, and separating the light paraffins from gas products. The process solves the problems encountered in traditional separation processes for hydrocarbon feedstocks, e.g. the requirement of solvent extraction, complexity in process, high cost, and low value of heavy aromatics and non-aromatics obtained after separation.

CN101734986A discloses a process for producing more benzene and xylene by hydrocracking of cracking gasoline. The process comprises reacting a C7+ cracking gasoline feedstock in the presence of a catalyst, subjecting heavy aromatics to hydrodealkylation and to transalkylation reaction with light aromatics, subjecting the light aromatics to isomerization reaction to convert them into a component rich in BTX light aromatics, separating liquid products into benzene, toluene, xylene and a C9+ fraction according to the difference in boiling points, wherein the toluene and the C9+ fraction can be recycled for further treatment, and separating the light paraffins from gas products. The process solves the problems encountered in traditional processes for treating cracking gasoline, that is only a separation of BTX (B is benzene, T is toluene and X is xylene) aromatics is conducted, the light aromatic product comprises a large amount of toluene, and the value of the separated heavy aromatics and non-aromatics is low.

CN103930524A discloses a process for converting a biomass into products, comprising the steps of contacting the biomass with hydrogen in the presence of a hydropyrolysis catalyst in a fluidized bed reaction vessel under hydropyrolysis conditions; and removing the product and carbon from the reaction vessel, wherein the carbon and the catalyst are separated according to the difference in settling velocities.

The technology disclosed in the above patent applications shows that existing heavy aromatics upgrading technologies mostly adopt a fixed bed hydrodealkylation process, and have the disadvantages of harsh reaction conditions, complex operation and strict requirement on catalysts.

SUMMARY OF THE INVENTION

An object of the present application is to provide a method and system for treating catalytic cracking products, which method can efficiently convert C9+ aromatics present in catalytic cracking oil gas and catalytic cracking gasoline into C6-C8 light aromatics, and can produce more light olefins while allowing a long-period stable operation.

To achieve the above object, in an aspect, the present application provides a method for treating a catalytic cracking product, comprising the steps of:
  i) carrying out a first fractionation on a catalytic cracking oil gas or catalytic cracking gasoline from a catalytic cracking reactor to obtain a heavy gasoline and optionally a light gasoline, wherein the light gasoline has an initial boiling point of about 20-40° C., and a final boiling point of about 80-100° C., the heavy gasoline has an initial boiling point of about 80-100° C., and a final boiling point of about 200-250° C.;
  ii) carrying out a second fractionation on the heavy gasoline to obtain a heavy fraction of gasoline and optionally a middle fraction of gasoline, wherein the middle fraction of gasoline comprises C6-C8 light aromatics, has an initial boiling point of about 80-100° C., and a final boiling point of about 120-150° C., and the heavy fraction of gasoline comprises C9+ aromatics, and has an initial boiling point of about 120-150° C., and a final boiling point of about 200-250° C.;
  iii) optionally, carrying out an aromatics extraction on the middle fraction of gasoline to obtain BTX aromatics and an aromatic raffinate oil;
  iv) sending the heavy fraction of gasoline to a fluidized reactor to contact with a dealkylation catalyst for dealkylation in the presence of hydrogen to obtain a dealkylated liquid product and a spent dealkylation catalyst; and
  v) recycling said dealkylated liquid product to step ii) to conduct the second fractionation with said heavy gasoline.

In another aspect, the present application provides a catalytic cracking process comprising the steps of:
  a) contacting a hydrocarbon-containing feedstock oil with a catalytic cracking catalyst in a catalytic cracking reactor for catalytic cracking reaction to obtain a catalytic cracking oil gas; and
  b) treating the catalytic cracking oil gas by using the method for treating catalytic cracking product according to the present application.

In another aspect, the present application provides a system for treating a catalytic cracking product, comprising a catalytic cracking product inlet, a first separation unit, a second separation unit, a dealkylation unit, and optionally an aromatics extraction unit;
  wherein the first separation unit comprises a first separator, the first separator is provided with a first oil gas inlet, a light gasoline outlet, a heavy gasoline outlet and optionally other product outlet(s), the first oil gas inlet is communicated with the catalytic cracking product inlet, and optionally the light gasoline outlet is communicated with a feedstock inlet of a catalytic cracking reactor;
  the second separation unit comprises a distillate splitting column, the distillate splitting column is provided with a second oil gas inlet, an outlet for middle fraction of gasoline and an outlet for heavy fraction of gasoline, and the second oil gas inlet is communicated with the heavy gasoline outlet;
  the aromatics extraction unit comprises an aromatics extraction and separation device, the aromatics extraction and separation device is provided with a third oil gas inlet, a BTX aromatics outlet and an aromatic raffinate oil outlet, the third oil gas inlet is communicated with the outlet for middle fraction of gasoline, and optionally the aromatic raffinate oil outlet is communicated with a feedstock inlet of a catalytic cracking reactor;
  the dealkylation unit comprises a fluidized reactor, the fluidized reactor is provided with a fourth oil gas inlet and an oil gas outlet, the fourth oil gas inlet is communicated with the outlet for heavy fraction of gasoline of the distillate splitting column, and the oil gas outlet is communicated with the second oil gas inlet of the distillate splitting column.

In still another aspect, the present application provides a catalytic cracking system, comprising a catalytic cracking unit and the system for treating catalytic cracking product according to the present application, wherein the catalytic cracking unit comprises a catalytic cracking reactor and optionally a catalytic cracking catalyst regenerator, an oil gas outlet of the catalytic cracking reactor is communicated with the catalytic cracking product inlet of the system for treating catalytic cracking product, a feedstock inlet of the catalytic cracking reactor is communicated with the light gasoline outlet, and/or the feedstock inlet of the catalytic cracking reactor is communicated with the aromatic raffinate oil outlet.

In the method and system according to the present application, a fluidized reaction system is used to carry out a hydrodealkylation treatment on heavy aromatics present in catalytic cracking products, so that the heavy aromatics can be efficiently converted into light olefins and light aromatics, and the yield of light aromatics can be improved. Besides, the method further provides the benefits of easy regeneration of catalyst, convenient operation and control, and long-period stable operation.

Additional features and advantages of the present application will be described in detail in the Detailed Description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the Detailed Description hereinbelow. In the drawings.

DETAILED DESCRIPTION OF THE INVENTION

The present application will be further described hereinafter in detail with reference to specific embodiments thereof and the accompanying drawings. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, such as any possible value within ±5% of the exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the present application, the term "C9+ aromatics" is a generic term for aromatic compounds having 9 or more carbon atoms, which is intended to cover any existing aromatic compound having 9 or more than 9 carbon atoms. Similarly, in the present application, the term "C12+ aromatics" is a generic term for aromatic compounds having 12 or more carbon atoms and is intended to cover any existing aromatic compound having 12 or more than 12 carbon atoms.

In the present application, the term "C6-C8 light aromatics" is a generic term for aromatic compounds having 6-8 carbon atoms, which is intended to cover any existing aromatic compound having 6, 7, or 8 carbon atoms.

In the present application, the terms "fluidized reactor" and "fluidized bed reactor" are used interchangeably, and refer to a reactor in which solid catalyst particles are brought into a state of suspension flow by a gaseous process stream to conduct a gas-solid reaction process, which include various forms of dilute-phase conveying beds, dense-phase conveying beds, bubbling fluidized beds, turbulent fluidized beds, fast fluidized beds, and the like.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to those skilled in the art that such a combination is obviously unreasonable.

All of the patent and non-patent documents cited herein, including but not limited to textbooks and journal articles, are hereby incorporated by reference in their entirety.

In a first aspect, the present application provides a method for treating a catalytic cracking product, comprising the steps of:
i) carrying out a first fractionation on a catalytic cracking oil gas and/or catalytic cracking gasoline from a catalytic cracking reactor to obtain a heavy gasoline and optionally a light gasoline;
ii) subjecting the heavy gasoline to a second fractionation to obtain a heavy fraction of gasoline and optionally a middle fraction of gasoline, wherein the middle fraction of gasoline comprises C6-C8 light aromatics and the heavy fraction of gasoline comprises C9+ aromatics;
iii) optionally, carrying out an aromatics extraction on the middle fraction of gasoline to obtain BTX aromatics and an aromatic raffinate oil;
iv) sending the heavy fraction of gasoline to a fluidized reactor to contact with a dealkylation catalyst for dealkylation in the presence of hydrogen to obtain a dealkylated liquid product and a spent dealkylation catalyst; and
v) recycling said dealkylated liquid product to step ii) to conduct the second fractionation with said heavy gasoline.

The method according to the present application can efficiently convert heavy aromatics in a catalytic cracking product into light olefins and light aromatics, improve the yield of light olefins, and allows a long-period stable operation.

According to the present application, the catalytic cracking product to be treated comes from a catalytic cracking reactor, and can be an oil gas resulted from catalytic cracking reaction, and/or a catalytic cracking gasoline obtained by separating the oil gas.

According to the present application, the device and operating conditions for the first fractionation in step i) are not particularly limited, for example, the device for the first fractionation may be a fractionation column, a flash drum, and the conditions for the first fractionation may be those conventionally used in the art. In a preferred embodiment, the first fractionation of step i) results in a light gasoline and a heavy gasoline, wherein said light gasoline has an initial boiling point of about 20-40° C. and a final boiling point of about 80-100° C.; the heavy gasoline has an initial boiling point of about 80-100° C., and a final boiling point of about 200-250° C.

According to the present application, the light gasoline obtained by the first fractionation in step i) may comprise olefins having 5 to 8 carbon atoms, while the heavy gasoline obtained mainly comprises aromatic and non-aromatic components having 6 to 11 carbon atoms. According to the present application, optionally the first fractionation in step i) may further produce other products, such as light olefins, C12+ aromatics and non-aromatic components, wherein the light olefins mainly comprise olefins having 2-4 carbon atoms.

Figure 1:
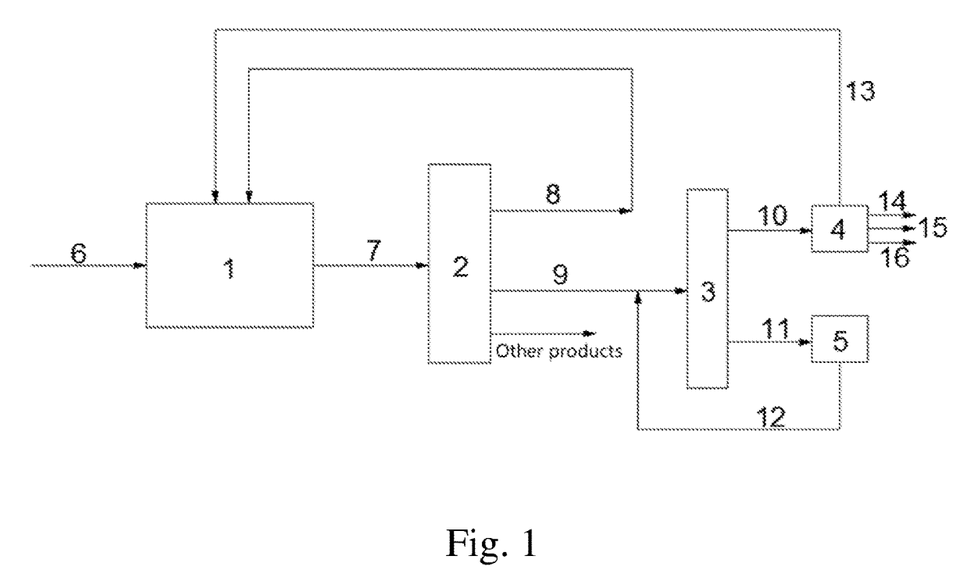
FIG. 1 shows a process flow diagram of a preferred embodiment of the catalytic cracking process according to the present application.

In order to further increase the yield of light olefins, in a preferred embodiment, as shown in FIG. 1, the light gasoline obtained from the first fractionation may be recycled to the catalytic cracking reactor for further catalytic cracking reaction. Further preferably, the catalytic cracking reactor comprises a riser reactor and a fluidized bed reactor, and the light gasoline can be recycled to the catalytic cracking reactor with no limitation to the position, i.e. can be recycled to the riser reactor or to the fluidized bed reactor.

According to the present application, the device and conditions for the second fractionation in step ii) are not particularly limited, for example, the device for the second fractionation may be a fractionation column, and the conditions for the second fractionation may be those conventionally used in the art. In a preferred embodiment, the second fractionation in step ii) results in a middle fraction of gasoline and a heavy fraction of gasoline, wherein the middle fraction of gasoline has an initial boiling point of about 80-100° C. and a final boiling point of about 120-150°

C.; and the heavy fraction of gasoline has an initial boiling point of about 120-150° C., and a final boiling point of about 200-250° C.

According to the present application, the middle fraction of gasoline obtained by the second fractionation in step ii) comprises mainly BTX aromatics, while the heavy fraction of gasoline obtained comprises mainly C9+ aromatics, as well as non-aromatic components such as naphthenes and paraffins.

According to the present application, in step iii), the middle fraction of gasoline can be subjected to aromatics extraction to further separate light aromatic products such as benzene, toluene and xylene. According to the present application, the device and conditions for the aromatics extraction in step iii) are not particularly limited, for example, the device for the aromatics extraction may comprise an extraction column, a solvent recovery column and an aromatic separation column, the extraction agent used may be those conventionally used in the art, such as sulfolane, tetraethylene glycol ether, diethylene glycol ether, N-methylpyrrolidone, and the type and operation conditions of the extraction column, the solvent recovery column and the aromatic separation column may be those conventionally used in the art, of which the detailed description is omitted here.

According to the present application, the aromatic raffinate oil obtained by the aromatics extraction in step iii) comprises non-aromatic components. In order to further increase the yield of light olefins, in a preferred embodiment, the aromatic raffinate oil can be recycled to the catalytic cracking reactor for further catalytic cracking reaction.

According to the present application, in step iv), the heavy fraction of gasoline comprising C9+ aromatics can be sent to a fluidized reactor in the presence of hydrogen to contact with a dealkylation catalyst for dealkylation, so that the C9+ aromatics are cracked and dealkylated to produce a dealkylation product and a spent dealkylation catalyst, wherein the dealkylation product can be subjected to gas-liquid separation to obtain a dealkylated liquid product and hydrogen.

According to the present application, the conditions for the dealkylation of the heavy fraction of gasoline in the fluidized reactor may vary within wide limits, and in a preferred embodiment the reaction temperature may be about 250-700° C., preferably about 320-580° C., more preferably about 350-550° C., such as about 380-500° C. or about 400-480° C.; the pressure (gauge pressure) may be from about 0 to about 6 MPa, preferably from about 0.1 to about 4.5 MPa, more preferably from about 1 to about 3.5 MPa; the weight hourly space velocity (e.g., for a dense-phase fluidized bed) may be from about 0.1 to about 120 $h^{-1}$, preferably from about 0.5 to about 80 $h^{-1}$, more preferably from about 1.5 to about 50 $h^{-1}$, such as from about 1 to about 30 $h^{-1}$, from about 1.5 to about 15 $h^{-1}$, from about 1 to about 10 $h^{-1}$, or from about 1.5 to about 10 $h^{-1}$, or the reaction time (e.g., for a conveying bed reactor) is from about 0.1 to about 40 seconds, preferably from about 0.5 to about 30 seconds, more preferably from about 1 to about 15 seconds, such as from about 0.2 to about 20 seconds, or from about 0.6 to about 10 seconds; the hydrogen/hydrocarbon molar ratio may be from about 1 to about 14, preferably from about 2 to about 11, and more preferably from about 3 to about 6.

According to the present application, the dealkylation catalyst used in the dealkylation reaction may comprise a carrier and an active metal component supported on the carrier, and the composition and content of the dealkylation catalyst may vary over a wide range. In a preferred embodiment, based on the total weight of the dealkylation catalyst, the carrier may be present in the dealkylation catalyst in an amount of from about 50 to about 99.99 wt. %, preferably from about 55 to about 85 wt. %; and the active metal component may be present in an amount of about 0.01 to about 50 wt %, preferably about 0.01 to about 45 wt %.

According to the present application, the active metal component is preferably one or more of rare earth metals and transition metals, such as Fe, Ni, Pt, Pd, Co and Mo, preferably Ni, Pt and Pd. When the active metal component is a noble metal, it is preferably present in an amount of about 0.01 to about 5 wt %; and when the active metal component is a non-noble metal, it is preferably present in an amount of about 0.01 to about 30 wt %, calculated on the basis of metal elements and based on the total weight of the dealkylation catalyst.

According to the present application, when the active metal component is a noble metal, the dealkylation catalyst does not need to be presulfided; and when the active metal component is a non-noble metal, the dealkylation catalyst may or may not be presulfided.

According to the present application, the composition and content of the carrier may also vary within a wide range. In a preferred embodiment, the carrier may comprise from about 1 to about 80 wt % of zeolite, from about 5 to about 99 wt % of inorganic oxide, and from about 0 to about 70 wt % of clay, based on the dry weight of the carrier; further preferably, the carrier may comprise about 10 to about 50 wt % of zeolite, about 10 to about 90 wt % of inorganic oxide, and about 1 to about 60 wt % of clay.

In a further preferred embodiment, the zeolite may comprise a mesoporous zeolite, a macroporous zeolite, or a combination thereof, preferably selected from the group consisting of mesoporous zeolite, macroporous zeolite, or a combination thereof. Further preferably, based on the total weight of the zeolite, the mesoporous zeolite is present in an amount of from about 0 to about 100 wt %, preferably from about 50 to about 100 wt %, more preferably from about 70 to about 90 wt %; the macroporous zeolite is present in an amount of about 0 to about 100 wt %, preferably about 0 to about 50 wt %, more preferably about 10 to about 30 wt %.

According to the present application, in the carrier of the dealkylation catalyst, the mesoporous and macroporous zeolites may be of the type conventionally used in the art, wherein the mesoporous zeolite is preferably one or more selected from ZSM zeolites and ZRP zeolites, and the macroporous zeolite is preferably one or more selected from β zeolites, REY zeolites, REHY zeolites, ultrastable Y zeolites and high silica Y zeolites.

According to the present application, in the carrier of the dealkylation catalyst, the inorganic oxide and the clay may each be of the type conventionally used in the art, for example, the inorganic oxide may be one or more of silica, alumina, zirconia, titania and amorphous silica-alumina, preferably silica and/or alumina; the clay may be one or more selected from kaolin, montmorillonite, diatomite, attapulgite, sepiolite, halloysite, hydrotalcite, bentonite and rectorite, preferably kaolin and/or halloysite.

According to the present application, the catalyst for dealkylation may be prepared by a method conventionally used in the art, for example, by supporting the active metal component onto the above-mentioned carrier by a pore saturation impregnation method.

According to the present application, the carrier may be subjected to hydrothermal aging treatment under the following conditions: a temperature of about 700° C. to about 850° C. and an atmosphere of up to 100% steam, or may be used without hydrothermal aging.

According to the present application, the dealkylation catalyst is preferably in the form of microspheroidal particles having the following particle size distribution: a mass fraction of particles from 0 to 20 μm of less than about 5%, a mass fraction of particles from 0 to 40 μm of less than about 30%, a mass fraction of particles from 0 to 149 μm of greater than about 80%, and an average particle size of about 50 to about 90 μm, preferably about 60 to about 80 μm; and a catalyst attrition index of less than 10%/h, preferably 5%/h.

According to the present application, the separation of the spent dealkylation catalyst from the dealkylation product obtained in step iv) can be carried out by means of cyclones well known to those skilled in the art, or by means of filters well known to those skilled in the art. The separated spent dealkylation catalyst can be sent to a dealkylation catalyst regenerator for regeneration and then recycled.

According to the present application, the dealkylation catalyst regenerator used may be of a type conventionally used in the art. In a preferred embodiment, the spent dealkylation catalyst can be sent to a fluidized bed regenerator for regeneration, and the resulted regenerated dealkylation catalyst can be returned back to the fluidized reactor, preferably all or at least part of the dealkylation catalyst used in step iv) is derived from the regenerated dealkylation catalyst. According to the present application, the regeneration of the spent dealkylation catalyst may be carried out in a manner well known to those skilled in the art, and in the regeneration process an oxygen-containing gas, for example air, may typically be introduced into the regenerator from the bottom thereof. After being introduced into the regenerator, the spent dealkylation catalyst is contacted with oxygen for regeneration by coke burning, the flue gas generated from the regeneration of the catalyst is subjected to gas-solid separation in an upper part of the regenerator, and then passed to a subsequent energy recovery system. Depending on the property of the active metal component of the catalyst, regeneration processes like reduction and sulfurization may be incorporated.

Figure 3:
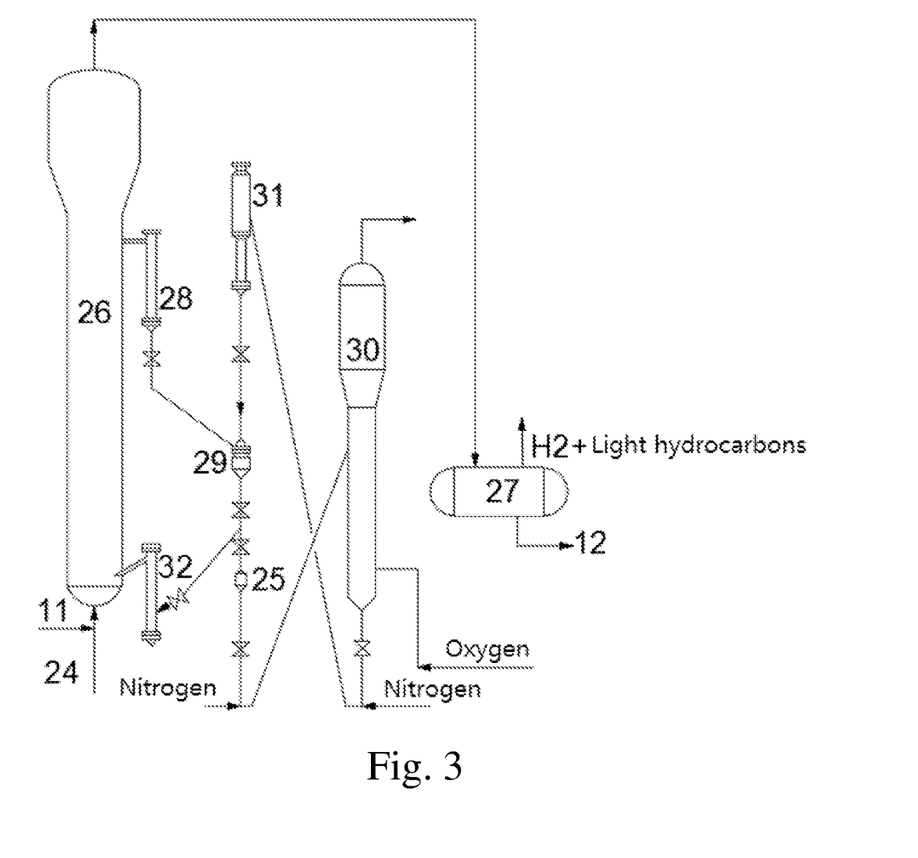
FIG. 3 shows a schematic diagram of a dealkylation unit of a preferred embodiment of the catalytic cracking system according to the present application.

To avoid the contact between hydrogen-containing gas stream with oxygen-containing gas stream during the catalyst regeneration, and to improve plant safety, in a preferred embodiment, as shown in FIG. 3, the fluidized bed regenerator may further comprise a lock hopper, and the regeneration method may comprise: passing the spent dealkylation catalyst through a lock hopper into the fluidized bed regenerator for regeneration and recycling the regenerated dealkylation catalyst to the fluidized reactor through the lock hopper. In this embodiment, the lock hopper allows for safe and efficient transfer of the dealkylation catalyst from the high pressure hydrocarbon or hydrogen environment in the reactor to the low pressure oxygen environment in the regenerator, and from the low pressure oxygen environment in the regenerator to the high pressure hydrocarbon or hydrogen environment in the reactor. In a preferred embodiment, the method of the present application further comprises the steps of depressurizing the spent catalyst and subsequently pressurizing the regenerated catalyst in the lock hopper.

According to the present application, by using the lock hopper, the reducing atmosphere (hydrogen atmosphere) in the reactor and the feeding tank of the regenerated dealkylation catalyst can be well isolated from the oxygen-containing atmosphere in the regenerator for coke-burning regeneration, so that the safety of the process and method can be ensured, the operating pressure of the reactor and the regenerator can be flexibly regulated and controlled. Particularly, the operating pressure of the reactor can be increased without increasing the operating pressure of the regenerator, so that the treatment capacity of the plant can be increased. The lock hopper described herein is a device that allows a stream to be switched between different atmospheres (e.g., oxidizing and reducing atmospheres) and/or different pressure environments (e.g., from high pressure to low pressure, or vice versa), the configuration and operation of which are easy to be realized by those skilled in the art based on the disclosure herein.

In a particularly preferred embodiment, as shown in FIG. 3, the fluidized bed regenerator may further comprise a reactor receiver 28, a regenerator receiver 31, a regenerator feed tank 25, and optionally a reducer 32, and the spent dealkylation catalyst withdrawn from the fluidized reactor may be transferred to the reactor receiver 28, then to the regenerator feed tank 25 via a lock hopper 29, and then from the regenerator feed tank 25 to the fluidized bed regenerator 30, and subjected to regeneration by coke burning in the regenerator under an oxygen-containing atmosphere to obtain a regenerated dealkylation catalyst; the regenerated dealkylation catalyst is continuously withdrawn from the fluidized bed regenerator 30, passed to the reducer 32 through the regenerator receiver 31, and recycled to the fluidized reactor for reuse after being reduced. Still further preferably, the spent dealkylation catalyst may be depressurized in the lock hopper 20 and the regenerated dealkylation catalyst may be pressurized in the lock hopper 20, if desired.

According to the present application, the fluidized reactor used is preferably selected from the group composed of a conveying bed reactor, a dense-phase fluidized bed reactor, a composite reactor composed of a conveying bed reactor and a dense-phase fluidized bed reactor, a composite reactor composed of two or more conveying bed reactors or a composite reactor composed of two or more dense-phase fluidized bed reactors; wherein the conveying bed reactor may be, for example, a riser reactor; and the dense-phase fluidized bed reactor may be, for example, a bubble bed reactor, a turbulent bed reactor, or the like. In a preferred embodiment, the fluidized reactor used is a dense-phase fluidized-bed reactor which may comprise an expanded segment at an upper part in which cyclones or catalyst filters may be provided for recovering catalyst entrained in the gas stream. When a dense-phase fluidized bed reactor or a riser reactor is used, the feeding and operation mode thereof may be the same as that conventionally adopted in existing dense-phase fluidized bed reactor and riser reactor, and there is no particular limitation in the present application.

According to the present application, in step v), the dealkylated liquid product enriched in C6-C8 light aromatics can be recycled to step ii) and subjected to the second fractionation together with said heavy gasoline, for further separation into the middle fraction of gasoline enriched in BTX aromatics and the heavy fraction of gasoline enriched in C9+ aromatics.

In a second aspect, the present application provides a catalytic cracking process comprising the steps of:
   a) contacting the feedstock oil with a catalytic cracking catalyst in a catalytic cracking reactor for catalytic cracking reaction to obtain a catalytic cracking oil gas; and b) treating the catalytic cracking oil gas by using the method for treating catalytic cracking product according to the present application.

According to the present application, the feedstock oil is not particularly limited, and may be, for example, at least one selected from gasoline, diesel oil, vacuum wax oil, atmospheric wax oil, coker wax oil, deasphalted oil, vacuum residue, atmospheric residue, extract oil and inferior recycle oil, coal liquefaction oil, tar sand oil, and shale oil.

According to the present application, the catalytic cracking reactor may be of a type conventionally used in the art. In a preferred embodiment, the catalytic cracking reactor comprises a dense-phase fluidized bed reactor and a riser reactor arranged from up to down. In embodiments where the light gasoline is recycled to the catalytic cracking reactor, the position at which the light gasoline is recycled may be the dense-phase fluidized bed reactor or the riser reactor. In embodiments where the aromatic raffinate oil is recycled to the catalytic cracking reactor, the position at which the aromatic raffinate oil is recycled may be the dense-phase fluidized bed reactor or the riser reactor.

According to the present application, the conditions of the catalytic cracking reaction of step a) may vary within wide limits. Preferably, in embodiments where the catalytic cracking reactor comprises a dense-phase fluidized bed reactor and a riser reactor arranged from up to down, the reaction conditions in the riser reactor may include: a reaction temperature of about 550-720° C., a reaction time of about 1-10 seconds, a reaction pressure of about 130-450 kPa, a catalyst-to-oil ratio of about 1-100:1; the reaction conditions in the dense-phase fluidized bed reactor may include: a reaction temperature of about 530-730° C., a reaction time of about 1-20 seconds, a weight hourly space velocity of about 0.5-20 $h^{-1}$, and a catalyst-to-oil ratio of about 1-100:1.

According to the present application, the catalytic cracking catalyst used in step a) may be those conventionally used in the art. In a preferred embodiment, the catalytic cracking catalyst may comprise, based on the total weight of the catalyst, about 1-60 wt % of zeolite, about 5-99 wt % of inorganic oxide, and about 0-70 wt % of clay, wherein the zeolite may comprise a mesoporous zeolite, a macroporous zeolite, or a combination thereof, preferably selected from the group consisting of mesoporous zeolite, macroporous zeolite, or a combination thereof; further preferably, the mesoporous zeolite may be present in an amount of about 50 to about 100 wt %, preferably about 70 to about 100 wt %, relative to the total weight of the zeolite, and the macroporous zeolite may be present in an amount of about 0 to about 50 wt %, preferably about 0 to about 30 wt %, relative to the total weight of the zeolite. According to the present application, in the catalytic cracking catalyst used, the mesoporous zeolite is preferably one or more selected from ZSM zeolites and ZRP zeolites, and the macroporous zeolite used is preferably one or more selected from β zeolites, REY zeolites, REHY zeolites, ultrastable Y zeolites and high silica Y zeolites; the inorganic oxide is preferably one or more selected from silica, alumina, zirconia, titania and amorphous silica-alumina; the clay is preferably one or more selected from kaolin, montmorillonite, diatomite, attapulgite, sepiolite, halloysite, hydrotalcite, bentonite and rectorite.

In a third aspect, the present application provides a system for treating a catalytic cracking product, comprising a catalytic cracking product inlet, a first separation unit, a second separation unit, a dealkylation unit, and optionally an aromatics extraction unit;

wherein the first separation unit comprises a first separator, the first separator is provided with a first oil gas inlet, a light gasoline outlet, a heavy gasoline outlet and optionally other product outlet(s), and the first oil gas inlet is communicated with the catalytic cracking product inlet;

the second separation unit comprises a distillate splitting column, the distillate splitting column is provided with a second oil gas inlet, an outlet for middle fraction of gasoline and an outlet for heavy fraction of gasoline, and the second oil gas inlet is communicated with the heavy gasoline outlet;

the aromatics extraction unit comprises an aromatics extraction and separation device, the aromatics extraction and separation device is provided with a third oil gas inlet, a BTX aromatics outlet and an aromatic raffinate oil outlet, and the third oil gas inlet is communicated with the outlet for middle fraction of gasoline;

the dealkylation unit comprises a fluidized reactor, the fluidized reactor is provided with a fourth oil gas inlet and an oil gas outlet, the fourth oil gas inlet is communicated with the outlet for heavy fraction of gasoline of the distillate splitting column, and the oil gas outlet is communicated with the second oil gas inlet of the distillate splitting column.

According to the present application, the light gasoline outlet can be optionally communicated with a feedstock inlet of a catalytic cracking reactor, so that the light gasoline can be recycled to the catalytic cracking reactor for further reaction.

According to the present application, the aromatic raffinate oil outlet can be optionally communicated with a feedstock inlet of a catalytic cracking reactor, so that the aromatic raffinate oil can be recycled to the catalytic cracking reactor for further reaction.

According to the present application, the first separation unit and the first separator are used for separating light gasoline from heavy gasoline in the catalytic cracking oil gas and catalytic cracking gasoline, and optionally separating other product(s) such as light olefins, C12+ aromatics and non-aromatic components. The first separator may be those conventionally used in the art, for example a fractionation column, a flash drum. The first oil gas inlet of the first separator is used for feeding catalytic cracking oil gas and catalytic cracking gasoline.

According to the present application, the second separation unit and the distillate splitting column are used for further separating the heavy gasoline obtained from the first separation unit into a middle fraction of gasoline and a heavy fraction of gasoline. The distillate splitting column may be of a type conventionally used in the art, for example a fractionation column.

The aromatics extraction unit and the aromatics extraction and separation device are used for separating BTX aromatics in the middle fraction of gasoline obtained by the second separation, and the aromatics extraction and separation device can be those conventionally used in the art. In a preferred embodiment, the aromatics extraction and separation device may comprise an aromatics extractor, an aromatics separation column and a solvent recoverer, and the aromatics extractor is provided with the third oil gas inlet, a solvent inlet, an aromatics-solvent mixture outlet and the aromatic raffinate oil outlet; the solvent recoverer is provided with an aromatics-solvent mixture inlet, an aromatics outlet and a solvent outlet, and the aromatics-solvent mixture inlet is communicated with the aromatics-solvent mixture outlet of the aromatics extractor; the aromatics separating column is provided with a fifth oil gas inlet and a BTX aromatics outlet, the fifth oil gas inlet is communicated with the aromatics outlet of the solvent recoverer, and the BTX aromatics outlet includes a benzene outlet, a toluene outlet and a xylene outlet.

According to the present application, the dealkylation unit is used for dealkylating the heavy fraction of gasoline obtained by the second separation to convert C9+ aromatics into C6-C8 light aromatics. The fluidized reactor used for carrying out the dealkylation reaction is not particularly limited, and may be those conventionally used in the art, and is preferably selected from a conveying bed reactor, a dense-phase fluidized bed reactor, a composite reactor composed of a conveying bed reactor and a dense-phase fluidized bed reactor, a composite reactor composed of two or more conveying bed reactors, or a composite reactor composed of two or more dense-phase fluidized bed reactors; wherein the conveying bed reactor is preferably a riser reactor; the dense-phase fluidized bed reactor can be a bubbling fluidized bed reactor, a turbulent fluidized bed reactor and the like; the fluidized reactor may be a riser reactor or a downer reactor.

To regenerate the spent catalyst, the dealkylation unit preferably comprises a dealkylation catalyst regenerator, which may be of a type conventionally used in the art, preferably a fluidized bed regenerator. In a further preferred embodiment, to prevent the oxygen containing gas stream from contacting the hydrogen containing gas stream during regeneration, the dealkylation catalyst regenerator is a fluidized bed regenerator with a lock hopper to further increase the safety of the system. In other preferred embodiments, the catalyst transfer between the dealkylation catalyst regenerator and the fluidized reactor of the dealkylation unit may be conducted using conventional regenerated catalyst standpipe and spent catalyst standpipe.

In a still further preferred embodiment, the fluidized bed regenerator may further comprise a reactor receiver, a regenerator receiver, a regenerator feed tank, and optionally a reducer.

In a fourth aspect, the present application provides a catalytic cracking system, comprising a catalytic cracking unit and the system for treating catalytic cracking product according to the present application, wherein the catalytic cracking unit comprises a catalytic cracking reactor and optionally a catalytic cracking catalyst regenerator, the oil gas outlet of the catalytic cracking reactor is communicated with the catalytic cracking product inlet of the system for treating catalytic cracking product.

In a preferred embodiment, the light gasoline outlet of the system for treating catalytic cracking product is communicated with the feedstock inlet of the catalytic cracking reactor, so as to return the light gasoline to the catalytic cracking reactor for recycling, and increase the yield of light olefins.

In a preferred embodiment, the aromatic raffinate oil outlet of the system for treating catalytic cracking product is communicated with the feedstock inlet of the catalytic cracking reactor, so as to return the aromatic raffinate oil to the catalytic cracking reactor for recycling, and increase the yield of light olefins.

In a particularly preferred embodiment, the light gasoline outlet and the aromatic raffinate outlet are respectively communicated with the feedstock inlet of the catalytic cracking reactor.

According to the present application, the catalytic cracking reactor may be of a type conventionally used in the art. In a preferred embodiment, the catalytic cracking reactor comprises a dense-phase fluidized bed reactor and a riser reactor arranged from up to down.

In a particularly preferred embodiment, as shown in FIG. 1, the catalytic cracking process of the present application comprises the follows:

A feedstock oil 6 is fed to a catalytic cracking unit 1 for catalytic cracking reaction, the resulted oil gas 7 is sent to a first separation unit 2 for separation to obtain a light gasoline 8, a heavy gasoline 9 and optionally other product(s); the light gasoline 8 is recycled to the catalytic cracking unit 1 for further reaction, the heavy gasoline 9 is sent to a second separation unit 3 (e.g. a distillate splitting column) for separation to obtain a middle fraction of gasoline 10 and a heavy fraction of gasoline 11, the middle fraction of gasoline 10 is sent to an aromatics extraction separation unit 4 for separation to obtain an aromatic raffinate oil 13, benzene 14, toluene 15 and xylene 16, the aromatic raffinate oil 13 is recycled to the catalytic cracking unit 1 for further reaction, the heavy fraction of gasoline 11 is sent to a dealkylation unit 5 for hydrodealkylation reaction, the hydrodealkylated liquid product 12 and the heavy gasoline 9 are mixed and then returned to the second separation unit 3 for further separation.

Figure 2:
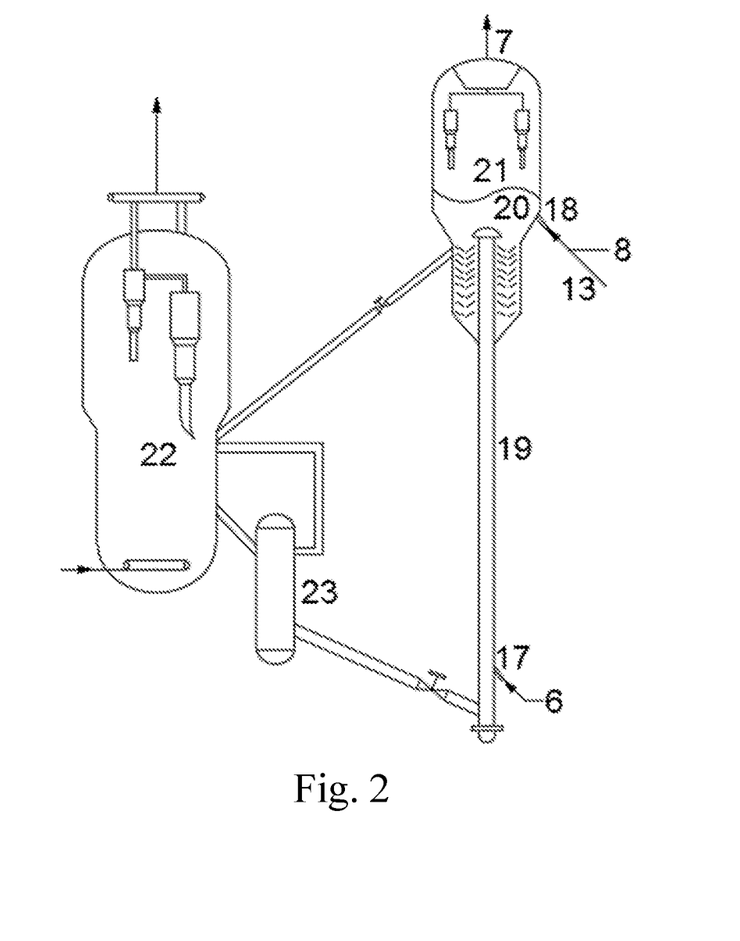
FIG. 2 shows a schematic diagram of a catalytic cracking unit of a preferred embodiment of the catalytic cracking system according to the present application.

As shown in FIG. 2, in a further preferred embodiment, in the catalytic cracking unit 1, a feedstock oil 6 is fed to a riser reactor 19 via a feedstock nozzle 17, the resulted mixture of oil gas and catalyst flows upwards along the riser to a dense-phase fluidized bed reactor 20, a mixture of the light gasoline 8 and the aromatic raffinate oil 13 is fed to the dense-phase fluidized bed reactor 20 via a light gasoline nozzle 18 for reaction, the resulted mixture of oil gas and catalyst is separated in a gas-solid separator 21 to obtain the oil gas 7, and the spent catalytic cracking catalyst is sent to a catalytic cracking catalyst regenerator 22 for regeneration, and then returned to the bottom of the riser reactor 19 for recycling, after being degassed in a degassing tank 23.

In a further preferred embodiment, as shown in FIG. 3, in the dealkylation unit 5, the heavy fraction of gasoline 11 and hydrogen 24 are sent to a fluidized hydrodealkylation reactor 26 to contact with a dealkylation catalyst for hydrodealkylation reaction, the reaction product is sent to a gas-liquid separation tank 27 for gas-liquid separation to obtain a hydrodealkylated liquid product 12 and hydrogen, the spent dealkylation catalyst is discharged from the fluidized hydrodealkylation reactor 26, passed to a lock hopper 29 through a reactor receiver 28, then to a regenerator feed tank 25, and finally to a dealkylation catalyst regenerator 30 (fluidized bed regenerator) for regeneration by coke burning in an oxygen-containing atmosphere in the regenerator, and the regenerated dealkylation catalyst obtained is discharged to a regenerator receiver 31, and then passed through the lock hopper 29 to a reducer 32, where it is reduced and recycled to the fluidized hydrodealkylation reactor 26 for reuse.

In some preferred embodiments, the present application provides the following technical solutions:

Item 1, a method for treating catalytic cracking gasoline, comprising the steps of:

carrying out a first fractionation on a catalytic cracking gasoline and/or catalytic cracking oil gas from a catalytic cracking unit to obtain a light gasoline, a heavy gasoline and optionally other products;

carrying out a second fractionation on the heavy gasoline to obtain a middle fraction of gasoline and a heavy fraction of gasoline, wherein the middle fraction of gasoline comprises C6-C8 light aromatics, and the heavy fraction of gasoline comprises C9+ heavy aromatics;

carrying out an aromatics extraction on the middle fraction of gasoline to obtain BTX aromatics and an aromatic raffinate oil;

sending the heavy fraction of gasoline to a fluidized reactor to contact with a second catalyst for dealkylation reaction in the presence of hydrogen to obtain a dealkylated liquid product and a spent catalyst; and subjecting the dealkylated liquid product to the second fractionation after mixing with the heavy gasoline.

Item 2, the method of Item 1, further comprising the step of recycling the light gasoline to the catalytic cracking unit for further catalytic cracking reaction.

Item 3, the method of Item 1 or 2, wherein the light gasoline has an initial boiling point of 20-40° C. and a final boiling point of 80-100° C.; the heavy gasoline has an initial boiling point of 80-100° C., and a final boiling point of 200-250° C.

Item 4, the method of Item 1, wherein the middle fraction of gasoline has an initial boiling point of 80-100° C. and a final boiling point of 120-150° C.; and the heavy fraction of gasoline has an initial boiling point of 120-150° C., and a final boiling point of 200-250° C.

Item 5, the method of Item 1, further comprising the step of recycling the aromatic raffinate oil to the catalytic cracking unit for further catalytic cracking reaction.

Item 6, the method of Item 1, wherein the conditions for the dealkylation reaction include a temperature of 250-700° C., a pressure of 0-6 MPa, a weight hourly space velocity of 0.1-6.5 $h^{-1}$, and a hydrogen/hydrocarbon molar ratio of 1-14; preferably, the conditions for the dealkylation reaction include a temperature of 320-580° C., a pressure of 0.1-4.5 MPa, a weight hourly space velocity of 0.5-6 $h^{-1}$, and a hydrogen/hydrocarbon molar ratio of 2-11; more preferably, the conditions for the dealkylation reaction include a temperature of 350-550° C., a pressure of 1-3.5 MPa, a weight hourly space velocity of 1.5-4 $h^{-1}$, and a hydrogen/hydrocarbon molar ratio of 3-6.

Item 7, the method of Item 1, wherein the second catalyst comprises a carrier and an active metal component supported on the carrier; the active metal component is present in an amount of 0.01 to 50 wt % based on the total weight of the second catalyst.

Item 8, the method of Item 7, wherein the carrier comprises, based on the total weight of the carrier: 1-60 wt % of zeolite, 5-99 wt % of inorganic oxide, and 0-70 wt % of clay; the zeolite comprises a mesoporous zeolite, a macroporous zeolite, or a combination thereof; the inorganic oxide is at least one of silica, alumina, zirconia, titania and amorphous silica-alumina; the clay is at least one selected from kaolin, montmorillonite, diatomite, attapulgite, sepiolite, halloysite, hydrotalcite, bentonite and rectorite.

Item 9, the method of Item 8, wherein the mesoporous zeolite is a ZSM zeolite and/or a ZRP zeolite and the macroporous zeolite is one or more selected from 0 zeolite, REY zeolite, REHY zeolite, ultrastable Y zeolite, and high silica Y zeolite.

Item 10, the method of Item 7, wherein the active metal component is one or a combination of two or more of rare earth metals and transition metals.

Item 11, the method of Item 1, wherein the method further comprises: feeding the second spent catalyst into a fluidized bed regenerator for regeneration, and recycling the resulted second regenerated catalyst to the fluidized reactor.

Item 12, the method of Item 11, wherein the fluidized bed regenerator comprises a lock hopper, and the regeneration method comprises: passing the second spent catalyst to the fluidized bed regenerator for regeneration through a lock hopper, and returning the second regenerated catalyst back to the fluidized reactor through the lock hopper.

Item 13, the method of Item 1, wherein the fluidized reactor is a dilute-phase conveying bed reactor, a dense-phase fluidized bed reactor, a composite reactor composed of a dilute-phase conveying bed reactor and a dense-phase fluidized bed reactor, a composite reactor composed of two or more dilute-phase conveying bed reactors, or a composite reactor composed of two or more dense-phase fluidized bed reactors.

Item 14, the method of Item 1 or 13, wherein the fluidized reactor is a riser reactor or a downer reactor.

Item 15, a catalytic cracking process, comprising the steps of contacting a feedstock oil with a first catalyst in a catalytic cracking reactor for catalytic cracking reaction to obtain a catalytic cracking oil gas, and treating the catalytic cracking oil gas by using the method for treating catalytic cracking oil gas of any one of Items 1-14.

Item 16, a system for treating catalytic cracking gasoline, comprising a catalytic cracking gasoline inlet, a first separation unit, a second separation unit, an aromatics extraction unit, and a dealkylation unit;

the first separation unit comprises a first separator, and the first separator is provided with a first oil gas inlet, a light gasoline outlet, a heavy gasoline outlet and optionally other product outlet(s); the first oil gas inlet is communicated with the catalytic cracking gasoline inlet; the light gasoline outlet is optionally communicated with a feedstock inlet of a catalytic cracking reactor;

the second separation unit comprises a distillate splitting column, the distillate splitting column is provided with a second oil gas inlet, an outlet for middle fraction of gasoline and an outlet for heavy fraction of gasoline, and the second oil gas inlet is communicated with the heavy gasoline outlet;

the aromatics extraction unit comprises an aromatics extraction and separation device, and the aromatics extraction and separation device is provided with a third oil gas inlet, a BTX aromatics outlet and an aromatic raffinate oil outlet; the third oil gas inlet is communicated with the outlet for middle fraction of gasoline; the aromatic raffinate oil outlet is optionally communicated with a feedstock inlet of a catalytic cracking reactor;

the dealkylation unit comprises a fluidized reactor, the fluidized reactor is provided with a fourth oil gas inlet and an oil gas outlet, the fourth oil gas inlet is communicated with the outlet for heavy fraction of gasoline of the distillate splitting column, and the oil gas outlet is communicated with the second oil gas inlet of the distillate splitting column.

Item 17, the system of Item 16, wherein the aromatics extraction and separation device comprises an aromatics extractor, an aromatics separation column, and a solvent recoverer, and the aromatics extractor is provided with the third oil gas inlet, a solvent inlet, an aromatics-solvent mixture outlet, and the aromatic raffinate oil outlet; the solvent recoverer is provided with an aromatics-solvent mixture inlet, an aromatics outlet and a solvent outlet, and the aromatics-solvent mixture inlet is communicated with the aromatics-solvent mixture outlet of the aromatics extractor; the aromatics separating column is provided with a fifth oil gas inlet and the BTX aromatics outlet, the fifth oil gas inlet is communicated with the aromatics outlet of the solvent recoverer, and the BTX aromatics outlet includes a benzene outlet, a toluene outlet and a xylene outlet.

Item 18, the system of Item 16, wherein the dealkylation unit further comprises a second catalyst regenerator that is a fluidized bed regenerator equipped with a lock hopper.

Item 19, the system of Item 16, wherein the fluidized reactor is a dilute-phase conveying bed reactor, a dense-phase fluidized bed reactor, a composite reactor composed of a dilute-phase conveying bed reactor and a dense-phase fluidized bed reactor, a composite reactor composed of two or more dilute-phase conveying bed reactors, or a composite reactor composed of two or more dense-phase fluidized bed reactors; the dilute-phase conveying bed reactor is a riser reactor; the dense-phase fluidized bed reactor is a bubbling fluidized bed reactor, a turbulent fluidized bed reactor or the like; and the fluidized reactor is a riser reactor or a downer reactor.

Item 20, a catalytic cracking plant, comprising a catalytic cracking unit and the system of any one of Items 16-19, wherein an oil gas outlet of the catalytic cracking unit is communicated with the catalytic cracking oil gas inlet of the system, a feedstock inlet of the catalytic cracking unit is communicated with the light gasoline outlet, and a feedstock inlet of the catalytic cracking unit is communicated with the aromatic raffinate oil outlet.

EXAMPLES

The present application will be further illustrated with reference to the following examples, but the present application is not limited thereto.

Catalyst Preparation Example 1

Alumina sol (Qilu Branch of Sinopec Catalyst Co. ltd.) was divided into two parts with the same quantity, one part was mixed with kaolin (Qilu Branch of Sinopec Catalyst Co. ltd.), formed into slurry with a solid content of 40 wt % by using deionized water, uniformly stirred, the slurry was adjusted to a pH of 3.5 by using hydrochloric acid, maintained at the pH value, stood and aged at 60° C. for 1.5 hours, the rest of the alumina sol was added, stirred for 1.0 hour to form a colloid, a ZSM-5 molecular sieve (available from Qilu Branch of Sinopec Catalyst Co. ltd.) and a Y molecular sieve (available from Qilu Branch of Sinopec Catalyst Co. ltd.) were added to form a carrier slurry (with a solid content of 35 wt %), further stirred, and spray dried to obtain a microsphere carrier, wherein the weight ration of ZSM-5 molecular sieve:Y molecular sieve:kaolin:aluminum sol=30:10:39:21.

The microsphere carrier was then calcined at 500° C. for 1 hour, washed with ammonium sulfate (ammonium sulfate: microsphere carrier:water=0.5:1:10) at 60° C. to a sodium oxide content of less than 0.25 wt. %, rinsed with deionized water and filtered, and then dried at 110° C. to obtain carrier C1 used in this example.

The carrier C1 was subjected to hydrothermal aging (800° C., 100% of steam, for 12 hours) and then added into a $PdCl_2$ solution for incipient wetness impregnation at an impregnation temperature of 80° C. for 120 min, dried for 2 hours at a temperature of 150° C., and then the carrier impregnated with Pd was added into a chloroplatinic acid solution for incipient wetness impregnation at an impregnation temperature of 80° C. for 120 min; the resultant was washed with deionized water, dried for 2 hours at a temperature of 150° C., calcined for 4 hours at a temperature of 500° C., and the calcined catalyst was reduced for 2 hours at a temperature of 100° C. in a hydrogen-containing gas, to obtain a catalyst H1 loaded with active metals Pd and Pt, wherein the loading amounts of Pd and Pt were respectively 0.04 wt % and 0.04 wt % (calculated on the basis of metal elements and relative to the total weight of the catalyst), the abrasion index was 3.2%/h, and the particle size distribution was as follows: the mass fraction of particles with a particle size of 0-20 μm was 3%, the mass fraction of particles with a particle size of 0-40 μm was 22%, the mass fraction of particles with a particle size of 0-149 μm was 89%, and the average particle size was 75 μm.

Catalyst Preparation Example 2

The carrier C1 was subjected to hydrothermal aging (800° C., 100% of steam, for 12 hours) and added into a $NiCl_2$ solution for incipient wetness impregnation at an impregnation temperature of 80° C. for 120 min, washed with deionized water, dried for 2 hours at 150° C., calcined for 4 hours at 500° C., and the calcined catalyst was subjected to presulfurization treatment to obtain a NiS-loaded catalyst H2, wherein the loading amount of NiS was 6.5% (calculated on the basis of Ni and relative to the total weight of the catalyst), the abrasion index was 3.2%/h, and the particle size distribution was as follows: the mass fraction of particles with a particle size of 0-20 μm was 3%, the mass fraction of particles with a particle size of 0-40 μm was 22%, the mass fraction of particles with a particle size of 0-149 μm was 89%, and the average particle size was 75 μm.

Catalyst Preparation Example 3

Alumina sol was divided into two parts with the same quantity, one part was mixed with kaolin, formed into slurry with a solid content of 40 wt % by using deionized water, uniformly stirred, the slurry was adjusted to a pH of 3.5 by using hydrochloric acid, maintained at the pH value, stood and aged for 1.5 hours at 60° C., then the rest of the alumina sol was added, stirred for 1.0 hour to form a colloid, a Y molecular sieve was added to form a carrier slurry (with a solid content of 35 wt %), further stirred, and spray dried to obtain a microsphere carrier, wherein the Y molecular sieve: kaolin:aluminum sol=40:39:21.

The microspherical carrier was then calcined at 500° C. for 1 hour, washed with ammonium sulfate (ammonium sulfate:microspherical support:water=0.5:1:10) at 60° C. to a sodium oxide content of less than 0.25 wt %, rinsed with deionized water and filtered, and then dried at 110° C. to obtain a carrier C2 used in this example.

The carrier C2 was subjected to hydrothermal aging (800° C., 100% of steam, for 12 hours) and then added into a $PdCl_2$ solution for incipient wetness impregnation at an impregnation temperature of 80° C. for 120 min, dried at 150° C. for 2 hours, the carrier impregnated with Pd was then added into a chloroplatinic acid solution for incipient wetness impregnation at an impregnation temperature of 80° C. for 120 min, washed with deionized water, dried at 150° C. for 2 hours, calcined at 500° C. for 4 hours, the calcined catalyst was reduced in a hydrogen-containing gas at 100° C. for 2 hours to obtain a catalyst H3 loaded with active metals Pd and Pt, wherein the loading amounts of Pd and Pt were 0.04 wt % and 0.04 wt % respectively (calculated on the basis of metal elements and relative to the total weight of the catalyst), the abrasion index was 2.8%/h, and the particle size distribution was as follows: the mass fraction of particles with a particle size of 0-20 μm was 2.5%, the mass fraction of particles with a particle size of 0-40 μm was 19%, the mass fraction of particles with a particle size of 0-149 μm was 91%, and the average particle size was 73 μm.

Catalyst Preparation Example 4

The carrier C1 was subjected to hydrothermal aging (800° C., 100% of steam, for 12 hours) and then added into a $NiCl_2$ solution for incipient wetness impregnation at an impregnation temperature of 80° C. for 120 min, washed with deionized water, dried at 150° C. for 2 hours, calcined at 500° C. for 4 hours, and the calcined catalyst was reduced in a hydrogen-containing gas at 100° C. for 2 hours without presulfurization treatment to obtain a Ni-loaded catalyst H4, wherein the loading amount of Ni was 6.5% (calculated on the basis of Ni and relative to the total weight of the catalyst), the abrasion index was 3.2%/h, and the particle size distribution was as follows: the mass fraction of particles with a particle size of 0-20 μm was 3%, the mass fraction of particles with a particle size of 0-40 μm was 22%, the mass fraction of particles with a particle size of 0-149 μm was 89%, and the average particle size was 75 μm.

Catalyst Preparation Example 5

The carrier C1 was added, without subjecting to hydrothermal aging, into a PdCl$_2$ solution for incipient wetness impregnation at an impregnation temperature of 80° C. for 120 min, dried at a temperature of 150° C. for 2 hours, then the carrier impregnated with Pd into was added into a chloroplatinic acid solution for incipient wetness impregnation at an impregnation temperature of 80° C. for 120 min, washed with deionized water, dried at a temperature of 150° C. for 2 hours, calcined at a temperature of 500° C. for 4 hours, the calcined catalyst was reduced in a hydrogen-containing gas at a temperature of 100° C. for 2 hours to obtain a catalyst H5 loaded with active metals Pd and Pt, wherein the loading amounts of Pd and Pt were 0.04 wt % and 0.04 wt % respectively (calculated on the basis of metal elements and relative to the total weight of the catalyst), the abrasion index was 3.2%/h, and the particle size distribution was as follows: the mass fraction of particles with a particle size of 0-20 μm was 2.5%, the mass fraction of particles with a particle size of 0-40 μm was 16%, the mass fraction of particles with a particle size of 0-149 μm was 87%, and the average particle size was 78 μm.

The properties of the feedstocks used in the following examples and comparative examples are shown in Tables 1 and 2, where feedstock A is a vacuum distillate and feedstock B is a catalytic cracking gasoline.

TABLE 1

Properties of feedstock A

| Name of heavy oil feedstock | A |
|---|---|
| Density (20° C.), kg/m$^3$ | 912.1 |
| Carbon residue, wt % | 3.14 |
| S, wt. % | 0.39 |
| N, wt. % | 0.13 |
| C, wt. % | 86.95 |
| H, wt. % | 12.69 |
| Metal content, μg/g | |
| Ni | 3.1 |
| V | 3.2 |
| Fe | 0.2 |

TABLE 1-continued

Properties of feedstock A

| Name of heavy oil feedstock | | A |
|---|---|---|
| Group analysis, wt % | | |
| Saturates | | 54.7 |
| Aromatics | | 33.5 |
| Resins | | 11.6 |
| Asphaltenes | | 0.2 |

TABLE 2

Properties of feedstock B

| Name of cracking gasoline | | B |
|---|---|---|
| Density at 20° C./(kg/m$^3$) | | 768.2 |
| Hydrocarbon composition by mass/% | Paraffins | 8.41 |
| | Naphthenes | 2.58 |
| | Olefins | 25.44 |
| | Aromatics | 63.57 |
| | C$_9$ aromatics | 32.26 |
| Distillation range/° C. | 5% | 40.2 |
| | 10% | 45.8 |
| | 30% | 76.7 |
| | 50% | 100.8 |
| | 70% | 133.7 |
| | 90% | 164.3 |
| | 95% | 199.1 |

In the following examples and comparative examples, the catalytic cracking catalyst used in the catalytic cracking reactor was a conventional catalytic cracking catalyst C3, manufactured by ChangLing Branch of Sinopec Catalyst Co. ltd., with a trade name of DMMC-2.

Examples 1 to 5

The experiments were carried out according to the schemes shown in FIGS. 1-3, respectively, using the feedstock A, in which the dealkylation reaction was carried out on a pilot dense-phase fluidized bed reactor with continuous regeneration, and relevant conditions and products are listed in Table 3.

Example 6

The experiments were carried out according to the schemes shown in FIGS. 1 and 3, but without the catalytic cracking unit, in which the feedstock B was fed directly to the dealkylation unit, and the dealkylation reaction was carried out on a pilot dense-phase fluidized bed reactor with continuous regeneration, and relevant conditions and products are listed in Table 3.

TABLE 3

Conditions and products of Examples 1-6

| | Ex. 1 | Ex. 2 | Ex. 3 | Ex. 4 | Ex. 5 | Ex. 6 |
|---|---|---|---|---|---|---|
| Feedstock | A | A | A | A | A | B |
| Conditions for catalytic cracking | | | | | | |
| Catalyst | C3 | C3 | C3 | C3 | C3 | — |
| Reactor type | Riser reactor plus dense-phase fluidized bed | Riser reactor plus dense-phase fluidized bed | Riser reactor plus dense-phase fluidized bed | Riser reactor plus dense-phase fluidized bed | Riser reactor plus dense-phase fluidized bed | |

TABLE 3-continued

Conditions and products of Examples 1-6

|  | Ex. 1 | Ex. 2 | Ex. 3 | Ex. 4 | Ex. 5 | Ex. 6 |
|---|---|---|---|---|---|---|
| Light gasoline recycle position | Dense-phase fluidized bed | Dense-phase fluidized bed | Dense-phase fluidized bed | Dense-phase fluidized bed | Lower part of riser reactor | — |
| Reaction temperature in dense phase fluidized bed/° C. | 635 | 635 | 635 | 635 | 635 | — |
| Weight hourly space velocity/h$^{-1}$ | 4 | 4 | 4 | 4 | 4 | — |
| Reaction temperature in riser reactor/° C. | 650 | 650 | 650 | 650 | 650 | — |
| Reaction time/s | 1.8 | 1.8 | 1.8 | 1.8 | 1.8 | — |
| Catalyst-to-oil ratio | 15 | 15 | 15 | 15 | 15 | — |
| Hydrodealkylation conditions | | | | | | |
| Catalyst | H1 | H1 | H2 | H3 | H1 | H1 |
| Reactor type | Dense-phase fluidized bed | Dense-phase fluidized bed | Dense-phase fluidized bed | Dense-phase fluidized bed | Dense-phase fluidized bed | Dense-phase fluidized bed |
| Reaction temperature/° C. | 450 | 480 | 450 | 460 | 450 | 480 |
| pressure/MPa | 1 | 1 | 1 | 1 | 1 | 2 |
| Space velocity/h$^{-1}$ | 2 | 2 | 2 | 2 | 2 | 3 |
| Hydrogen/hydrocarbon molar ratio | 3 | 3 | 3 | 3 | 3 | 3 |
| Yield of products/% | | | | | | |
| Dry gas | 13.7 | 13.4 | 13.7 | 13.9 | 14.0 | 8.9 |
| Ethylene | 9.0 | 8.8 | 8.9 | 8.3 | 9.2 | 0.2 |
| Liquefied gas | 44.9 | 44.7 | 44.8 | 44.8 | 45.1 | 18.2 |
| Propylene | 27.3 | 27.1 | 27.2 | 26.8 | 27.4 | 0.1 |
| BTX | 18.8 | 19.6 | 19.0 | 19.1 | 18.8 | 49.4 |
| C9+ aromatics | 2.9 | 2.3 | 2.7 | 3.0 | 3.0 | 12.2 |

Example 7

The experiment was carried out as described in Example 1, except that catalyst H4 was used. Relevant conditions and products are listed in Table 4.

Example 8

The experiment was carried out as described in Example 1, except that catalyst H5 was used. Relevant conditions and products are listed in Table 4.

Example 9

The experiment was carried out as described in Example 1, except that catalyst H2 was used and a riser reactor was used as the dealkylation reactor. Relevant conditions and products are listed in Table 4.

Example 10

The experiment was carried out as described in Example 1, except that catalyst H3 was used and a composite reactor of a riser reactor and a dense-phase fluidized bed reactor was used as the dealkylation reactor. Relevant conditions and products are listed in Table 4.

TABLE 4

Conditions and products of Examples 7-10

|  | Ex. 7 | Ex. 8 | Ex. 9 | Ex. 10 |
|---|---|---|---|---|
| Feedstock | A | A | A | A |
| Conditions for catalytic cracking | | | | |
| Catalyst | C3 | C3 | C3 | C3 |
| Reactor type | Riser reactor plus dense-phase fluidized bed | Riser reactor plus dense-phase fluidized bed | Riser reactor plus dense-phase fluidized bed | Riser reactor plus dense-phase fluidized bed |
| Light gasoline recycle position | Dense-phase fluidized bed | Dense-phase fluidized bed | Dense-phase fluidized bed | Dense-phase fluidized bed |

TABLE 4-continued

Conditions and products of Examples 7-10

|  | Ex. 7 | Ex. 8 | Ex. 9 | Ex. 10 |
|---|---|---|---|---|
| Reaction temperature in dense-phase fluidized bed/° c. | 635 | 635 | 635 | 635 |
| Weight hourly space velocity/h$^{-1}$ | 4 | 4 | 4 | 4 |
| Reaction temperature in riser reactor/° C. | 650 | 650 | 650 | 650 |
| Reaction time/s | 1.8 | 1.8 | 1.8 | 1.8 |
| Catalyst-to-oil ratio | 15 | 15 | 15 | 15 |
| Hydrodealkylation conditions |  |  |  |  |
| Catalyst | H4 | H5 | H2 | H3 |
| Reactor type | Dense-phase fluidized bed | Dense-phase fluidized bed | Riser reactor | Riser reactor plus dense-phase fluidized bed |
| Reaction temperature/° C. | 450 | 450 | 450 | 450 |
| Pressure/MPa | 1 | 1 | 1 | 1 |
| Space velocity/h$^{-1}$ | 2 | 2 | Reaction time 2 s | Reaction time 2 s + dense-phase fluidized bed space velocity 6 |
| Hydrogen/hydrocarbon molar ratio | 3 | 3 | 3 | 3 |
| Yield of products/% |  |  |  |  |
| Dry gas | 13.3 | 14.0 | 12.4 | 13.3 |
| Ethylene | 8.7 | 9.2 | 8.1 | 8.5 |
| Liquefied gas | 44.4 | 45.3 | 42.9 | 43.7 |
| Propylene | 26.9 | 27.4 | 25.2 | 26.4 |
| BTX | 19.3 | 19.6 | 20.8 | 20.2 |
| C9+ aromatics | 2.4 | 2.1 | 4.5 | 3.9 |

Comparative Example 1

The experiment was carried out as described in Example 1, except that the heavy gasoline was directly sent to the aromatics extraction and separation unit, without undergoing the distillate splitting and the hydrodealkylation reaction, and separated to obtain an aromatic raffinate oil, benzene, toluene, xylene, and C9+ aromatics, wherein the light gasoline was recycled to the catalytic cracking reactor for further reaction, and the aromatic raffinate oil was not recycled to the catalytic cracking reactor. Relevant conditions and products are listed in Table 5.

Comparative Example 2

The experiment was carried out as described in Example 1, except that the product of the catalytic cracking unit was not subjected to hydrodealkylation, but only to fractionation and aromatics extraction and separation to obtain light olefins, BTX, light gasoline, heavy gasoline, aromatic raffinate oil, etc., and the light gasoline and the aromatic raffinate oil were not recycled to the catalytic cracking reactor. Relevant conditions and products are listed in Table 5.

Comparative Example 3

The experiment was carried out as described in Example 1, except that the reactor of the dealkylation unit was a fixed bed reactor and the catalyst was not continuously regenerated. Relevant conditions and products are listed in Table 5.

Comparative Example 4

The experiment was carried out as described in Example 1, except that the carrier C2 was used in the reactor of the dealkylation unit as a catalytic cracking catalyst and the reaction was carried out in the absence of hydrogen. Relevant conditions and products are listed in Table 5.

TABLE 5

Conditions and products of Comparative Examples 1-4

|  | Comp. Ex. 1 | Comp. Ex. 2 | Comp. Ex. 3 | Comp. Ex. 4 |
|---|---|---|---|---|
| Feedstock | A | A | A | A |
| Conditions for catalytic cracking |  |  |  |  |
| Catalyst | C3 | C3 | C3 | C3 |
| Reactor type | Riser reactor plus dense-phase fluidized bed | Riser reactor plus dense-phase fluidized bed | Riser reactor plus dense-phase fluidized bed | Riser reactor plus dense-phase fluidized bed |

TABLE 5-continued

Conditions and products of Comparative Examples 1-4

| | Comp. Ex. 1 | Comp. Ex. 2 | Comp. Ex. 3 | Comp. Ex. 4 |
|---|---|---|---|---|
| Light gasoline recycle position | Dense-phase fluidized bed | — | Dense-phase fluidized bed | Dense-phase fluidized bed |
| Reaction temperature in dense-phase fluidized bed/° C. | 635 | 635 | 635 | 635 |
| Weight hourly space velocity/h$^{-1}$ | 4 | 4 | 4 | 4 |
| Reaction temperature in riser reactor/° C. | 650 | 650 | 650 | 650 |
| Reaction time/s | 1.8 | 1.8 | 1.8 | 1.8 |
| Catalyst-to-oil ratio | 15 | 15 | 15 | 15 |
| Hydrodealkylation conditions | | | | |
| Catalyst | — | — | H1 | C2 |
| Reactor type | — | — | Fixed bed | Dense-phase fluidized bed |
| Reaction temperature/° C. | — | — | 450 | 580 |
| Pressure/MPa | — | — | 1 | Atmospheric pressure |
| Space velocity/h$^{-1}$ | — | — | 2 | 8 |
| Hydrogen/hydrocarbon molar ratio | — | — | 3 | — |
| Yield of products/% | | | | |
| Dry gas | 12.2 | 10.6 | 14.5 | 12.8 |
| Ethylene | 7.9 | 6.1 | 9.4 | 8.2 |
| Liquefied gas | 42.9 | 40.2 | 45.3 | 43.3 |
| Propylene | 25.3 | 21.0 | 27.7 | 25.9 |
| BTX | 13.5 | 12.1 | 16.2 | 15.3 |
| C9+ aromatics | 9.6 | 8.0 | 4.4 | 6.9 |

From the results of the above examples and comparative examples, it can be seen that the method for treating catalytic cracking product according to the present application can reduce the content of C9+ aromatics in the product and increase the content of BTX light aromatics. The catalytic cracking process according to the present application can effectively convert heavy aromatics in the cracking product into light aromatics, improve the BTX aromatic content, and reduce the C9+ aromatics content. The method and process of the present application employ a fluidized reaction system, have great flexibility in operation, and allow a long-period stable operation, in which the catalyst is easy to be regenerated, and the mass and heat transfer is uniform.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A method for treating a catalytic cracking product, comprising the steps of:

feeding a first feed into a catalytic cracking reactor for catalytic cracking reaction in presence of a catalytic cracking catalyst to produce the catalytic cracking product;

carrying out a first fractionation on the catalytic cracking product to obtain a heavy gasoline and a light gasoline, wherein the light gasoline has an initial boiling point of about 20-40° C. and a final boiling point of about 80-100° C., the heavy gasoline has an initial boiling point of about 80-100° C. and a final boiling point of about 200-250° C.;

carrying out a second fractionation on a second feed to obtain a heavy fraction of gasoline and a middle fraction of gasoline, wherein the middle fraction of gasoline comprises C6-C8 light aromatics, has an initial boiling point of about 80-100° C., and a final boiling point of about 120-150° C., and the heavy fraction of gasoline comprises C9+ aromatics, has an initial boiling point of about 120-150° C., and a final boiling point of about 200-250° C.;

carrying out an aromatics extraction on the middle fraction of gasoline to obtain BTX aromatics and an aromatic raffinate oil;

sending the heavy fraction of gasoline to a fluidized reactor for dealkylation in the presence of hydrogen and a dealkylation catalyst to obtain a dealkylated liquid product and a spent dealkylation catalyst; and wherein the first feed comprises a hydrocarbon-containing feedstock oil, the light gasoline and the aromatic raffinate oil, and wherein the second feed comprises the heavy gasoline and the dealkylated liquid product, wherein the catalytic cracking product comprises a catalytic cracking oil gas, and a catalytic cracking gasoline.

2. The method according to claim 1, wherein the dealkylation is carried out at a temperature of about 250-700° C., a pressure (gauge pressure) of about 0-6 MPa, a weight hourly space velocity of about 0.1-120 h$^{-1}$ or a reaction time of about 0.1-40 seconds, and a hydrogen/hydrocarbon molar ratio of about 1-14.

3. The method according to claim 1, wherein the dealkylation catalyst comprises a carrier and an active metal component supported on the carrier, wherein the active metal component is present in an amount of about 0.01-50 wt. %, based on the total weight of the dealkylation catalyst,
wherein, based on the total weight of the carrier, the carrier comprises: about 1-80 wt % of zeolite, about 5-99 wt % of inorganic oxide, and about 0-70 wt % of clay;
wherein the zeolite comprises a mesoporous zeolite, a macroporous zeolite, or a combination thereof;
wherein the inorganic oxide is one or more selected from silica, alumina, zirconia, titania and amorphous silica-alumina; the clay is one or more selected from kaolin, montmorillonite, diatomite, attapulgite, sepiolite, halloysite, hydrotalcite, bentonite and rectorite, and
wherein the active metal component is one or more selected from rare earth metals and transition metals.

4. The method according to claim 3, wherein the mesoporous zeolite is one or more selected from ZSM zeolites and ZRP zeolites, and the macroporous zeolite is one or more selected from β zeolites, REY zeolites, REHY zeolites, ultrastable Y zeolites and high silica Y zeolites.

5. The method according to claim 3, wherein, based on the total weight of the zeolite, the mesoporous zeolite is present in an amount of about 0-100 wt %, and the macroporous zeolite is present in an amount of about 0-100 wt %.

6. The method according to claim 5, wherein the mesoporous zeolite is present in an amount of from about 50-100 wt %.

7. The method according to claim 5, wherein the mesoporous zeolite is present in an amount of from about 70-90 wt %.

8. The method according to claim 5, wherein the macroporous zeolite is present in an amount of from about 0-50 wt %.

9. The method according to claim 5, wherein the macroporous zeolite is present in an amount of from about 10-30 wt %.

10. The method according to claim 1, further comprising:
sending the spent dealkylation catalyst to a fluidized bed regenerator for regeneration, and recycling the regenerated dealkylation catalyst to the fluidized reactor.

11. The method according to claim 10, wherein the fluidized bed regenerator comprises a lock hopper, and the regeneration is carried out by:
sending the spent dealkylation catalyst to the fluidized bed regenerator for regeneration through the lock hopper, and recycling the regenerated dealkylation catalyst to the fluidized reactor through the lock hopper.

12. The method according to claim 11, wherein the fluidized bed regenerator further comprises a reactor receiver, a regenerator receiver, a regenerator feed tank, and optionally a reducer, and the regeneration is carried out by:
withdrawing the spent dealkylation catalyst from the fluidized reactor, sending the spent dealkylation catalyst to the reactor receiver, and then to the regenerator feed tank through the lock hopper, and then transferring the spent dealkylation catalyst to the fluidized bed regenerator from the regenerator feed tank;
regenerating the spent dealkylation catalyst in the regenerator by coke burning in an oxygen-containing atmosphere to obtain the regenerated dealkylation catalyst; and
withdrawing the regenerated dealkylation catalyst from the fluidized bed regenerator, directly recycling the regenerated dealkylation catalyst to the fluidized reactor for reuse through the regenerator receiver, or recycling the regenerated dealkylation catalyst to the fluidized reactor for reuse after passing through a reducer for reduction.

13. The method according to claim 12, wherein the method further comprises the step of depressurizing the spent catalyst in the lock hopper and the step of pressurizing the regenerated catalyst.

14. The method according to claim 1, wherein the dealkylation is carried out at a temperature of about 320-580° C., a pressure of about 0.1-4.5 MPa, a weight hourly space velocity of about 0.5-80 h$^{-1}$ or a reaction time of about 0.5-30 seconds, and a hydrogen/hydrocarbon molar ratio of about 2-11.

15. The method according to claim 1, wherein the dealkylation is carried out at a temperature of about 350-550° C., a pressure of about 1-3.5 MPa, a weight hourly space velocity of about 1.5-50 h$^{-1}$ or a reaction time of about 1-15 seconds, and a hydrogen/hydrocarbon molar ratio of about 3-6.

16. A system for carrying out the method for treating the catalytic cracking product according to claim 1, comprising the catalytic cracking reactor, a first separation unit, a second separation unit, a dealkylation unit, and an aromatics extraction unit,
wherein the first separation unit comprises a first separator having a first oil gas inlet, a light gasoline outlet, and a heavy gasoline outlet, the first oil gas inlet is in fluid communication with the catalytic cracking reactor, and the light gasoline outlet is in fluid communication with a feedstock inlet of the catalytic cracking reactor;
the second separation unit comprises a distillate splitting column having a second oil gas inlet, an outlet for the middle fraction of gasoline and an outlet for the heavy fraction of gasoline, and the second oil gas inlet is in fluid communication with the heavy gasoline outlet;
the aromatics extraction unit comprises an aromatics extraction and separation device having a third oil gas inlet, a BTX aromatics outlet and an aromatic raffinate oil outlet, the third oil gas inlet is in fluid communication with the outlet for middle fraction of gasoline, and the aromatic raffinate oil outlet is in fluid communication with the feedstock inlet of the catalytic cracking reactor;
the dealkylation unit comprises the fluidized reactor having a fourth oil gas inlet and an oil gas outlet, the fourth oil gas inlet is in fluid communication with the outlet for the heavy fraction of gasoline of the distillate splitting column, and the oil gas outlet is in fluid communication with the second oil gas inlet of the distillate splitting column.

17. The system according to claim 16, wherein the aromatics extraction and separation device comprises an aromatics extractor, an aromatics separation column, and a solvent recoverer, the aromatics extractor is provided with the third oil gas inlet, a solvent inlet, an aromatics-solvent mixture outlet, and the aromatic raffinate oil outlet; the solvent recoverer is provided with an aromatics-solvent mixture inlet, an aromatics outlet and a solvent outlet, and the aromatics-solvent mixture inlet is communicated with the aromatics-solvent mixture outlet of the aromatics extractor; the aromatics separating column has a fifth oil gas inlet and a BTX aromatics outlet, the fifth oil gas inlet is in fluid communication with the aromatics outlet of the solvent recoverer, and the BTX aromatics outlet includes an outlet for benzene, an outlet for benzene, an outlet for toluene, and an outlet for xylene.

18. The system according to claim 16, wherein the dealkylation unit further comprises a dealkylation catalyst regenerator, which is a fluidized bed regenerator equipped with a lock hopper.

19. The system according to claim 18, wherein the dealkylation catalyst regenerator further comprises a reactor receiver, a regenerator receiver, a regenerator feed tank, and optionally a reducer.

20. The system according to claim 16, wherein the fluidized reactor is selected from a conveying bed reactor, a dense-phase fluidized bed reactor, a composite reactor composed of a conveying bed reactor and a dense-phase fluidized bed reactor, a composite reactor composed of two or more conveying bed reactors, and a composite reactor composed of two or more dense-phase fluidized bed reactors.

21. The system according to claim 20, wherein the conveying bed reactor is a riser reactor, and the dense-phase fluidized bed reactor is a bubbling fluidized bed reactor or a turbulent fluidized bed reactor.

22. A catalytic cracking system, comprising a catalytic cracking unit and the system according to claim 16, wherein the catalytic cracking unit comprises the catalytic cracking reactor and a catalytic cracking catalyst regenerator.

\* \* \* \* \*